INPUT/OUTPUT INTERFACE

INVENTORS
WILLIAM E. BOEHNER
BRUCE L. McGILVRAY
ATTORNEY

I/O OLD PSW

| SYSTEM MASK | KEY | AMWP | INTERRUPTION CHANNEL ADDRESS | INTERRUPTION DEVICE ADDRESS |
|---|---|---|---|---|
| 0    7 | 8    11 | 12    15 | 16    23 | 24    31 |

| ILC | CC | PROGRAM MASK | INSTRUCTION ADDRESS |
|---|---|---|---|
| 32 33 | 34 35 | 36    39 | 40    63 |

CSW

| KEY | 0000 | COMMAND ADDRESS (CA) |
|---|---|---|
| 0    3 | 4    7 | 8    31 |

| STATUS | 4 2 1 | BYTE COUNT |
|---|---|---|
| 32 | POSITION CODE    47 | 48    63 |

MULTIPLEXOR OR SELECTOR CHANNEL

CSW FOR I/O OR CU INITIATED INTERRUPT

| KEY | 0000 | ALL ZERO CA FIELD |
|---|---|---|
| 0    3 | 4    7 | 8    31 |

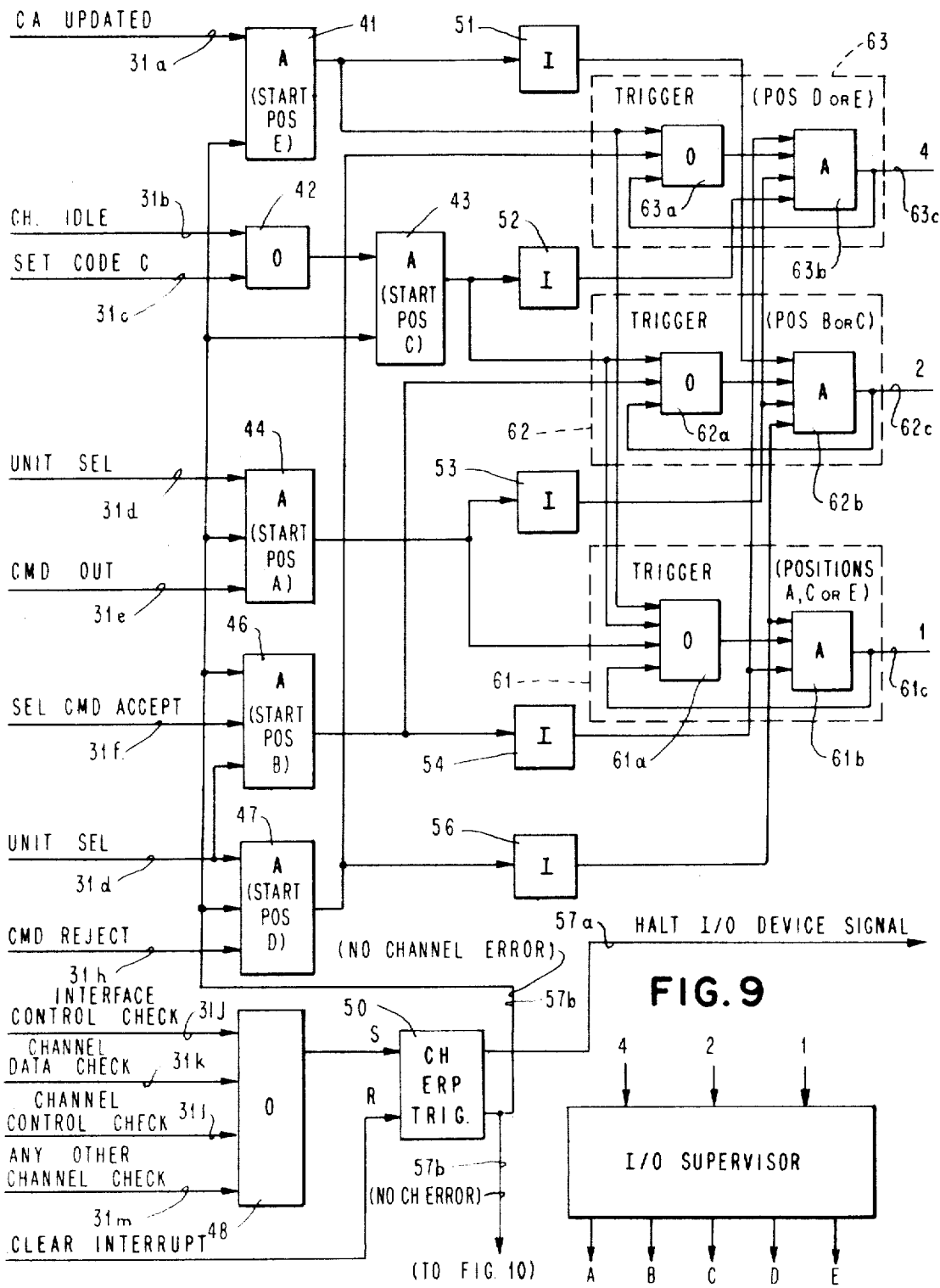

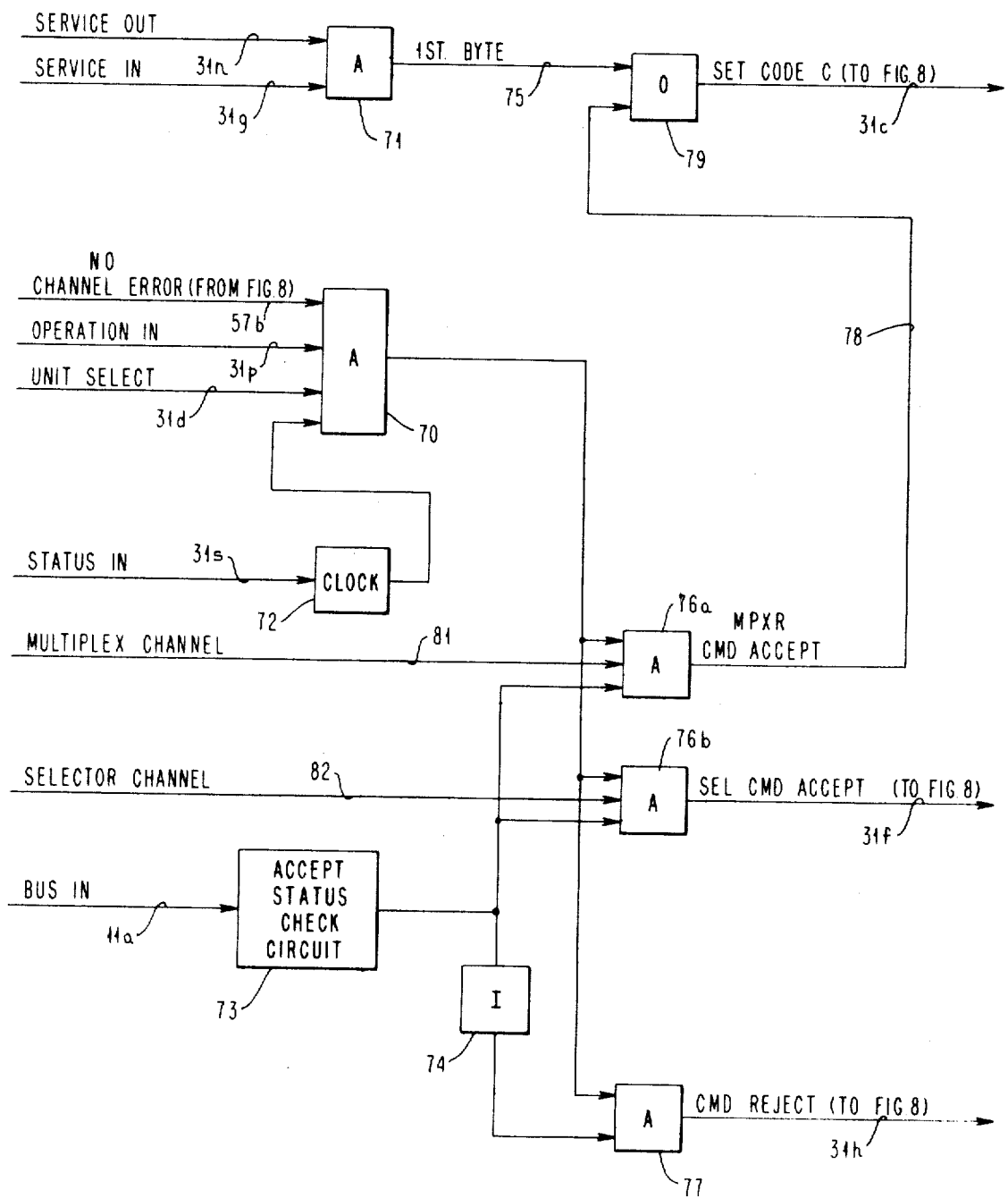

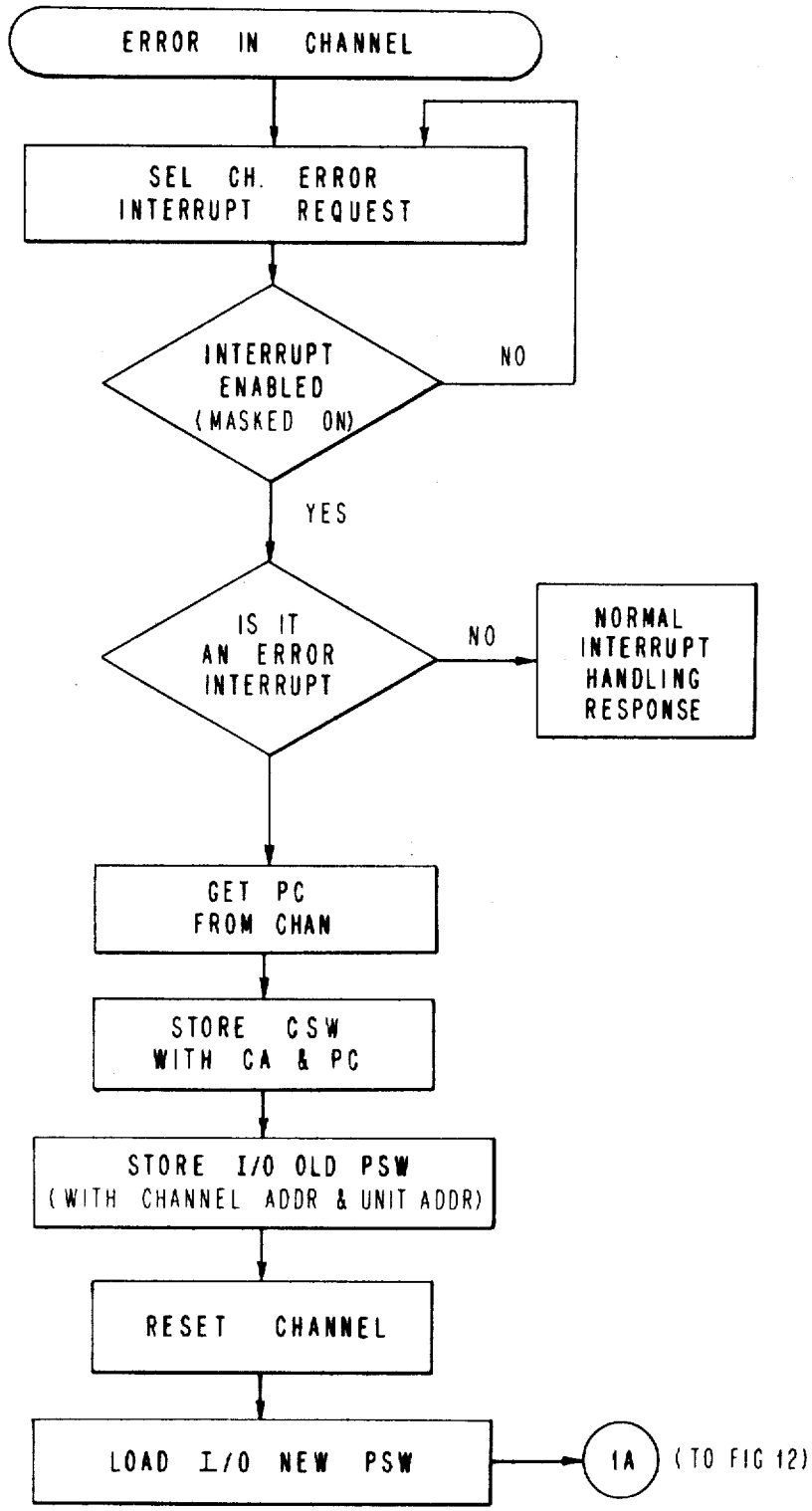

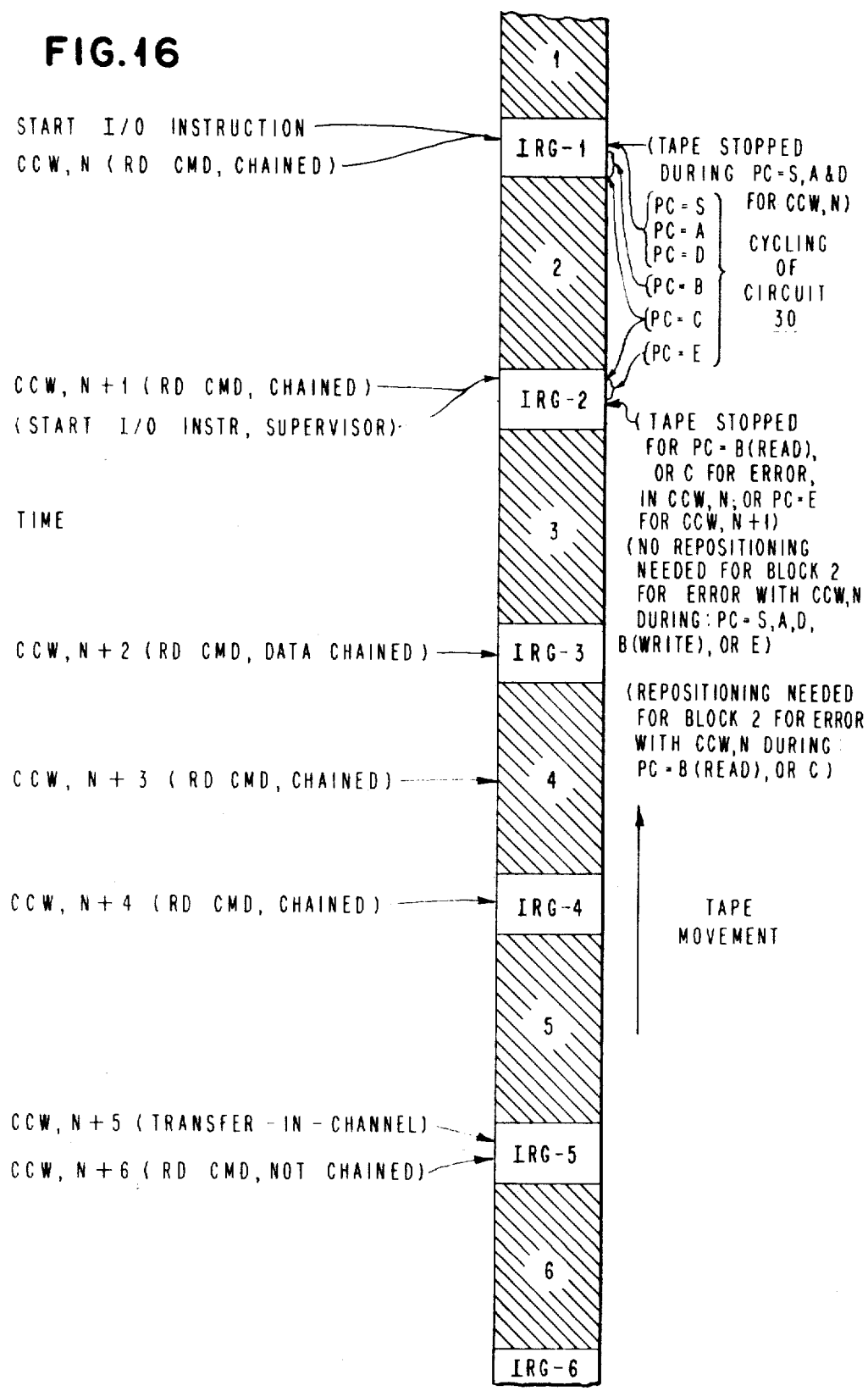

FIG. 17  SENSE BITS IN I/O STORAGE BLOCK (FOR TAPE DRIVE)

| BYTE NO. | BIT NO. | | | | | | | |
|---|---|---|---|---|---|---|---|---|
| | 0 | 1 | 2 | 3 | 4 | 5 | 6 | 7 |
| 1 | (FORCE ON FOR PC=D) CMD REJ | INT REQ | (FORCE ON FOR PC=B or E ON TAPE WRITE) BUS OUT | (FORCE ON FOR PC=A) EQUIP CHK | (FORCE ON FOR PC=C) ON TAPE READ) DATA CHK | (FORCE ON FOR PC=C) ON TAPE WRITE) OVER-RUN | WRT CT ZERO | DATA CNVTR CHK |
| 2 | NOISE | UNIT STATUS AVAIL | UNIT STATUS BUSY | 7 TRK | AT LOAD POINT | WR STATUS | FILE PROT | TAPE IND |

FIG. 18  CIRCUIT 30 CYCLING DURING NO ERROR

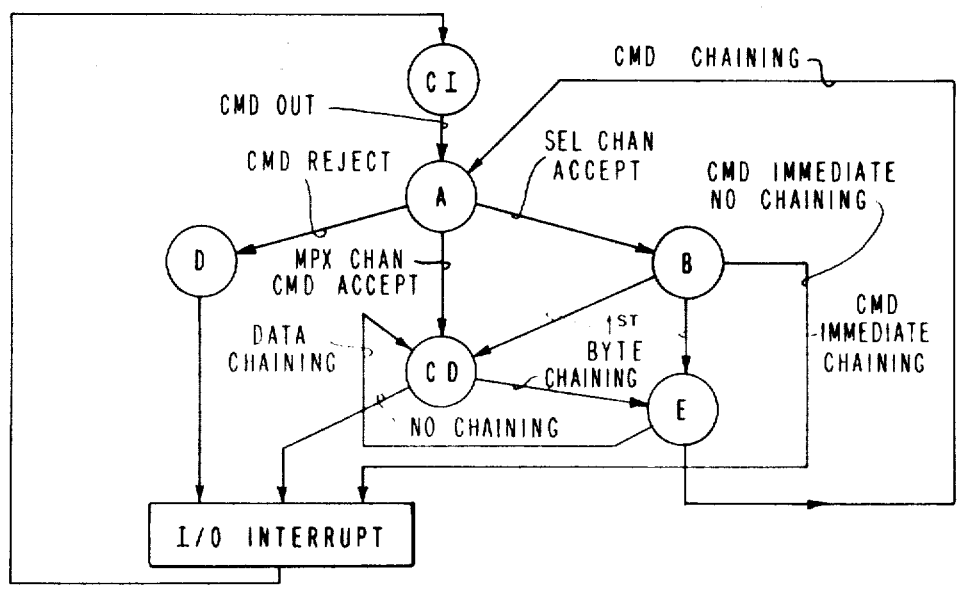

United States Patent Office 3,564,502
Patented Feb. 16, 1971

3,564,502
CHANNEL POSITION SIGNALING
METHOD AND MEANS
William E. Boehner, Poughkeepsie, and Bruce L. McGilvray, Pleasant Valley, N.Y., assignors to International Business Machines Corporation, Armonk, N.Y., a corporation of New York
Filed Jan. 15, 1968, Ser. No. 697,797
Int. Cl. G06f 11/06
U.S. Cl. 340—172.5
25 Claims

ABSTRACT OF THE DISCLOSURE

Position information about an interrupted I/O device communicated to the CPU as a result of an error in its channel, even though no error occurred in the I/O device. The positional information about such I/O device is chosen in relation to the execution steps in a channel instruction, so that a retry may be made of the channel instruction being executed at the time of the channel error.

The recovery action to be taken at the I/O device for the same channel instruction varies with the positional information existing at the time of the channel error.

With start-stop I/O devices, the invention enables a retry of a single erroneously executed channel command both during a command chaining operation, as well as during non-chained command operations.

The channel-I/O interface is monitored by a time-position signaling circuit, which discretely cycles at different points in the execution of a channel instruction (or command) to an I/O device to generate codes representing respective time-positions during the execution. At the moment of a channel error, the input to the signaling circuit is blocked, so that it continues to provide the position code existing at the time of the channel error. The position code is transmitted into the channel status word of a computer system by a channel interrupt caused by the channel error. Then, the I/O movement condition existing at the time of the error is obtainable from information in the channel status word by relating the position code to the particular channel instruction, so that a retry of the channel instruction can be made.

---

This invention relates generally to the ability to communicate I/O positional information to a CPU in a manner available for later use by the CPU or by I/O error recovery programs for retrying the particular channel command word in execution at the time that an error occurred in the channel.

Prior computer systems considered a channel error (as opposed to an I/O device error) to be catastrophic to the continuing operation of a computer system. Such channel errors included the channel in-board errors, such as a channel data check, channel control check, or interface control check. Whenever a channel in-board error occurred, prior computers aborted the entire computer operating system, and an exit was taken to a program called SER (System Environment Recording), that collected and recorded data relating to machine errors. The system thereafter recovered by the lengthy process of an IPL (Initial Program Load) of the operating system, job program and data, and repeating the previously executed part of the job. In some cases this would take several hours of computer system time.

Prior systems handled channel errors differently from certain types of I/O errors, which were generally recoverable by error recovery programs (ERP), such as the tape backspace and re-read (or re-write) operation to correct a transient. Any example of a prior tape write retry technique is described and claimed in U.S. Pat. No. 2,975,407 titled "Erase Forward" by H. O'Brien. Retry with CPU instructions found in error was disclosed and claimed in U.S. Pat. No. 3,248,697 to H. C. Montgomery.

Channel command retry is particularly complicated due to the fact that the channel is controlling an asynchronous external I/O device. It is not feasible upon detecting a channel error to merely re-execute the channel command in execution during the occurrence of the error. To attempt this as a blind automatic procedure would generate new errors and make the operation of the channel impossible.

This invention has discovered how a channel command can be retried under certain circumstances by relating parts of a channel-instruction execution to the position of the I/O device existing after a channel error interrupt.

The retry of an operation having an error has a substantial likelihood of success, since it has been statistically determined that over 75% of the errors occurring on computer systems, including channel type errors, are due to transient noise phenomenon. Such noise may be generated by many different and unrelated types of sources, some of which may never be determined. A few examples of sources of such noise are power switching in the computer vicinity, lightning bolts, individuals walking across a rug and discharging static electricity pulses nearby. A permanent error, such as a hardware circuit failure obviously cannot be corrected by a retry technique, although a hardware transient error might be so correctable until permanent hardware failure occurs.

It is therefore the primary object of this invention to provide a method for enabling a channel retry on intermittent channel in-board errors.

It is another object of this invention to provide a channel time-position code as a concept in channel retry method.

It is a further object of this invention to provide I/O positional information to a computer system so that it can retry a channel operation interrupted by a transient channel in-board error.

It is a further object of this invention to provide a circuit which stores channel position information for an I/O device being operated by a channel at the occurrence of a channel interrupt.

It is still another object of this invention to make a channel in-board error appear as an I/O device error to its computer system, so that the computer system can make use of I/O device error retry correction procedures.

It is a still further object of this invention to enable a computer system to contain at predetermined storage locations the total information needed for a channel retry, which is the I/O unit address, channel command address, and device positional information, as they existed at the time of a channel interrupt.

It is a still further object of this invention to make available all of the information needed for a channel operation retry with certain types of I/O devices by retrying the interrupted channel command word, and at most going back only a few channel command words for the retry.

It is another of this invention to provide a channel retry method with certain types of I/O devices using command chaining.

It is a still further object of this invention to provide a channel circuit which can give the information needed to the supervisory program so that it can make device movement decisions needed for a successful channel retry operation.

It is still another object of this invention to provide channel-execution positional information to a CPU to enable it to determine whether the I/O device movement condition is predictable, even though the location within the interrupted I/O data block (such as on tape or card) operation is unknown to the computer system.

The invention provides a method for recording the execution position of the channel at the time it was interrupted by an error in-board to its channel. The recorded positional information is in a form related to execution components of an instruction in a channel program, in order for the system to be able to determine if the position of the I/O device is predictable so that a retry can be attempted, even though the location on the I/O device of the interrupted data block operation is unknown to the computer system. The positional information may be sensed with the timing of predetermined channel to I/O interface signals which indicate discrete points of time relating directly to discrete points in the channel instruction execution, the points being variously related to I/O device movement, or preparation for movement. These channel-to-I/O interface signals and other channel control signals are chosen in relation to different retry procedures permissable upon a channel error occurring at different places during I/O control operations and I/O device responses thereto, including mechanical movement responses. The choice of discrete time and position intervals during the I/O and channel operation may take the following form: (1) the time prior to channel selection up to issuance of a command to the I/O device during the initial execution of a start I/O instruction; (2) the time from the transmission of a command to the device until the channel loses control of the device, such as up to a command acceptance or rejection analysis by the channel; (3) the time ending with the analysis by the channel of status signals from the I/O device indicating acceptance or rejection of the command; (4) the time beginning with the transmission of the first byte of data from the channel; (5) the time beginning with the change in the channel command word address during a command chaining operation for selecting the next command word. The time-position intervals (2) through (5) will repeat for each next command executed during a command chaining operation, except a transfer-in-channel type command, which maybe entirely executed during time-position interval (5).

Upon a channel error interrupt, the then existing one of time-positions (2) through (5) for the interrupted I/O device is recorded in a position signaling circuit. The unit address for this I/O device and the command address (CA) being used at the time of the interrupt are recorded by conventional means such as in the I/O old PSW (program status word) and the CSW (channel status word) in the commercially available computers, such as the IBM S/360 systems, at the fixed memory locations, such as decimal 56 and 64, respectively, whenever a channel or I/O interrupt occurs. The CSW contains status bits which indicate whether the error occurred in the I/O device, I/O control or channel. Hence these status bits can show that an error is in-board to the channel. This information stored in a computer system includes the channel address causing the interrupt, the address of the I/O device which was interrupted, the knowledge that the error is in the channel, the knowledge of the address of the channel command word (CCW) in execution at the time of error occurrence, and positional information about the device at the time of the interrupt. This information is sufficient in many situations to enable the computer system to execute an error recovery program (ERP), since it can then make correct decisions about device repositioning, when needed. Without the positional information, such as might be available in position code bits in a CSW, correct decisions about device repositioning could not be made by any error recovery program and it would then be essential to terminate the job being executed, and perhaps abort the entire computer operating system, requiring a costly initial program load (IPL) and job retry.

The device type being used at the time of a channel error is important in determining the type of retry operation needed for a quick recovery from a transient channel error.

This invention provides hardware that, with only minor modifications, permits the use of conventional error recovery programs developed for various types of I/O devices for permitting such devices to retry an operation interrupted by the occurrence of an error in the I/O device. That is, the information signaled by this invention may be used for linking to the appropriate error recovery program upon the interruption of the device operation by a channel error so that positioning of the interrupted device operation may be coordinated with a retry of the interrupted channel operation. One way of causing such a linking operation is to force the CPU or program to believe an error indication exists for the I/O device (even though it does not in fact exist) after an in-board channel error has been discovered.

The foregoing and other objects, features and advantages of the invention will be apparent from the following more particular description of the preferred embodiments of the invention, as illustrated in the accompanying drawings.

FIG. 1 illustrates the variety of I/O connections for an input/output interface in a computer system having both integrated and non-integrated channels.

FIGS. 2A and B illustrate the format for a conventionally used I/O old PSW (Program Status Word).

FIGS. 3A and B, and FIG. 5 illustrate formats for a conventional CSW (Channel Status Word) as modified to incorporate position code signalling by this invention.

FIG. 8 illustrates a particular embodiment of a position signalling circuit within this invention.

FIG. 9 represents an I/O supervisor which can decode the position code in a CSW.

FIG. 10 illustrate circuits for signalling the timing for certain inputs to FIG. 8.

FIGS. 11 through 15 represent flow diagrams which utilize the operation of the invention.

FIG. 16 illustrates tape movement on an I/O device in relation to the cycling of position codes during the execution of a channel program, as the position codes are received by the position code circuit and as received by the CSW after the occurrence of a channel error.

FIG. 17 represents sense bits as communicated from a tape drive to an I/O Storage Block.

FIG. 18 shows the many cycling sequences that can occur with the circuit position codes generated in FIG. 8 during the execution of different channel command words when no error occurs.

Reference is made to FIG. 16 to provide a background example using this invention. A magnetic tape is illustrated having a plurality of data blocks 1–6 recorded thereon. A set of seven computer channel instructions (CCW's) are illustrated which control the starting and reading of data from the tape. The respective channel instructions are shown in relation to the place on the tape at the read head when the respective instruction is fetched. The tape is stopped at the end of data block 1 until a Start I/O instruction is executed by the CPU. This instruction causes the fetch and execution of the first channel command CCW,N which is a read command that is chained, since its chain flag is set. Thus CCW,N is the first CCW in a CCW list. The tape drive responds to CCW,N by reading data block 2 to completion.

If no error occurred while executing CCW,N its chain flag causes the next CCW,N+1 to be executed without another Start I/O instruction, and the tape movement will not stop in IRG-2.

Figures 2A, 2B, 3A, 3B, 4, 5:
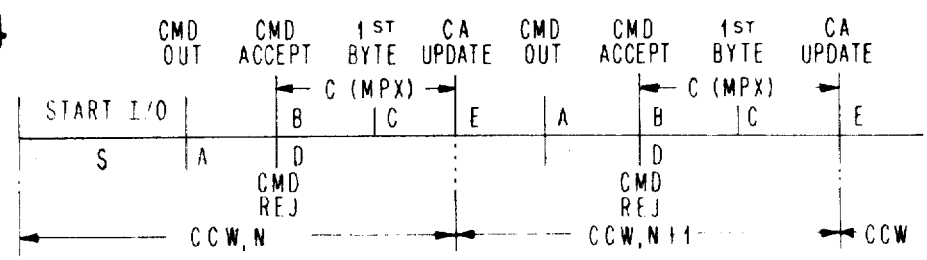
FIG. 4 illustrates position code (PC) timing relationships to channel command word (CCW) execution in an embodiment of the subject invention.

But if a channel error did occur during the execution of CCW,N, the tape will stop in IRG-2. Discrete time-positions S, A, B, C, D and E during execution of CCW,N are shown in FIG. 4. These time-positions may be represented by position codes (PC's) S, A, B, C, D and E, respectively. A recovery retry effort is related to which of these CCW execution positions existed in relation to the tape movement at the time of occurrence of a channel error.

The PC locations in FIG. 16 relative to IRG-1, block 2, and IRG-2 represent the place of the read head when the indicated PC was generated during cycling a position code generating circuit, later to be described. Thus PC's S, A, D can only occur before tape movement begins (D did not occur here because it is only used when the CCW operation is rejected). Also during a write command, B (not shown) occurs before tape movement. Even though tape has not moved yet during S, A, D and B (write), different types of recovery actions may occur in response to these different PC's. During a tape read, B (shown) occurs from before tape movement starts until the first byte of block 2 is read. A PC of C exists while data is being read from block 2 and while status bits are read at the end of the block including the Device End signal, which results in fetching the next CCW to cause a PC of E until the command is transmitted to the tape drive for the next command.

If a channel error occurred during the PC cycling S, A-E, different types of corrective action would result. A channel error occurring during the time-position S is retried by the CPU reissuing the Start I/O instruction because the I/O device has not yet received the command. An error during A (non-moveable), D or B (write) causes the current CCW to be retried and no adjustment action is needed at the tape drive, since this is before any mechanical motion can begin for the tape as a result of the Start I/O instruction.

However if the channel operation has passed the point of no return, which here occurs when the read command execution reaches a PC of B or C, the tape must be readjusted by stopping forward tape movement in IRG-2, and backspacing the tape to IRG-1 before CCW,N can be reissued for a retry.

The last PC is E during the execution of CCW,N. Position E exists after a successful transfer of the data of block 2. Accordingly a channel error during E does not affect the data transfer properties of the execution of CCW,N and the I/O device need not be affected. The only retry that need be done in response to E is to redetermine the address of the next CCW and refetch it. The address redetermination may involve the recalculation of the next address for a sequentially located CCW, or it may require the re-execution of a Transfer-In-Channel instruction that immediately follows to locate the next I/O-effective channel instruction.

If a channel error occurs during any of position codes B (read), C or E, the code existing at the time of error is stored in a position signaling circuit 30 (described later) until the end of tape data block 2 is reached. The CPU is interrupted because of the channel error. Then the position code is transferred from circuit 30 to predetermined status bit positions in the channel status word (CSW), which otherwise may be like the conventionally-used CSW in IBM S/360. As long as no errors occur, tape blocks continue to be read or written in response to chained channel command words (CCW's) until the chained list ends or until an error is sensed from the device, device control, or channel causing an interrupt, which stops the chaining for a retry. The stopping for retry is momentary for a transient error which does not exist during the retry. Retries for a current CCW may be preset to be repeated any number of times as long as the error persists, up to some predetermined maximum, at which the job or system may be terminated or aborted, depending on the existing conditions.

The I/O device response to a channel error will differ wth the particular type of channel command being executed. In general, commands are of two types, I/O move commands and I/O non-move commands. Examples of move commands are read, write, backspace, forwardspace, seek, search, etc. Examples of non-move commands are sense, transfer-in-channel, set file mask, mode set, etc. Each type of device generally has its own set of move and non-move commands.

FIGS. 11-15 illustrate flow diagrams representing how this time-positional information may be used for transient error recovery.

A Start I/O instruction is supplied by the supervisory program after the retry operation is completed to start up the channel program where it left off. The next channel instruction CCW,N+1 (read command, chained) is then issued and executed. If no error occurs, the remaining commands in the list which ends with CCW,N+6 are executed causing tape blocks 2-6 to be read with the tape stopping with the head in IRG-6.

The above illustration of a channel program operating a magnetic tape drive is also applicable to a channel program operating other types of I/O devices, such as a card punch or reader, disk file, printer. The channel may be a selector type, or a multiplexor type operating a large plurality of devices concurrently. Even though a multiplexor channel is operating a large plurality of I/O devices concurrently, it nevertheless executes only a single CCW at one time which sequentially can go through the position codes indicated in FIG. 4.

Figure 1:
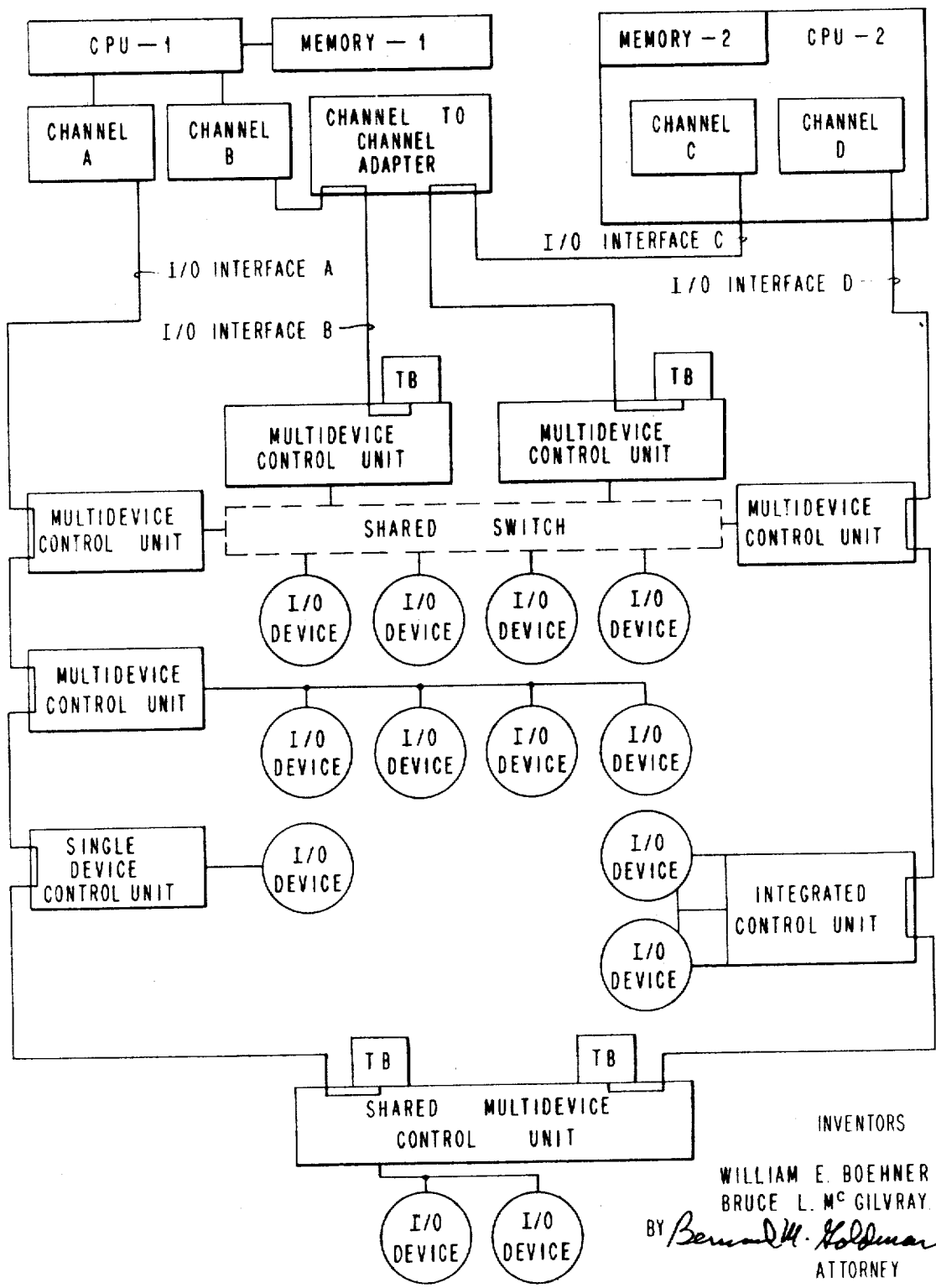

The general computer arrangement represented in FIG. 1 is found at a conventional computer installations and is used to illustrate a setting for the subject invention.

FIG. 1 shows a complex computer system having two CPU's and a multiplicity of I/O interface connections. Non-integrated channels A and B are connected to CPU 1, and integrated channels C and D are connected to CPU 2. An integrated channel time-shares some of its hardware with the CPU, while a non-integrated channel dedicates its hardware to channel operation. This invention applies to both, and to the selector channel type and to the multiplexor channel type. The channels have respective I/O interfaces A, B, C and D, which cannot connect to I/O devices through respective control units (CU's). A single device control unit can operate only a single I/O device. A multidevice control unit can control any of a plurilaty of I/O devices, in some cases through a shared I/O switch. A shared multidevice control unit can simultaneously operate plural I/O devices, while an integrated control unit has its I/O device in the same package. Each set of I/O interface lines is terminated at a terminal block (TB) found with the last control unit connected to the interface bus lines.

Thus any channel may reach any I/O device connectable to it via an intervening control unit, and in some cases also via a shared switch. Whenever an error is sensed within any unit, the error sets an interrupt storage circuit within the unit where the error occurred, such as the channel or control unit. The control unit generally also stores device interrupt indications. These interrupt indications remain pending in the interrupting source unit until they are cleared when the interrupt conditons are transferred to the CPU for setting into predetermined locations in main storage, reserved for the I/O old PSW and CSW.

This invention is particularly concerned with channel in-board error conditions, that is, error conditions occurring within channel A, B, C, or D per se, rather than with error conditions occurring within a control unit, shared switch, or I/O device.

Whenever such interrupt condition occurs within a channel A, B, C, or D that channel will be operating with a selected control unit and with a selected I/O device at the particular time of the error condition and resulting interrupt.

An interrupt induced by an error in the channel, control unit, or device causes the current program status word (PSW) for the system to be stored in a fixed memory location as the I/O old PSW in a large number of computer systems presently commercially used, i.e. IBM S/360 System. FIG. 2A and FIG. 2B represent the two words comprising the I/O old PSW stored at decimal memory location 56 in the memory of an IBM S/360 as a result of a channel induced interrupt. Bits 16–23 of this PSW contain the address of the channel from which the interrupt derived, and bit positions 24–31 contain the address of the device in operation on this channel at the time of the channel error.

Also at the time of a channel interrupt a channel status word (CSW) is stored at decimal memory location 64 in an S/360 computer system at the time of the channel interrupt. The CSW format using the two words shown in FIGS. 3A and B is conventional, except for position code bits 4, 2, 1 shown in FIG. 3B which are stored in the CSW as a function of this invention. The CSW bits 8–31 represent the next command address (CA) for fetching the next CCW (Channel Command World). Bits 32–47 represent status information regarding the I/O device, control unit, and channel communicated to the CPU as a result of an interrupt or a special instruction execution. An examination of these status bits by a program can determine the source and cause of the interruption. This invention may, of course, also be implemented by communicating the new status bits 4, 2, 1 to any other PSW or CSW format, or to any means linking to an error recovery operation.

Figure 6:
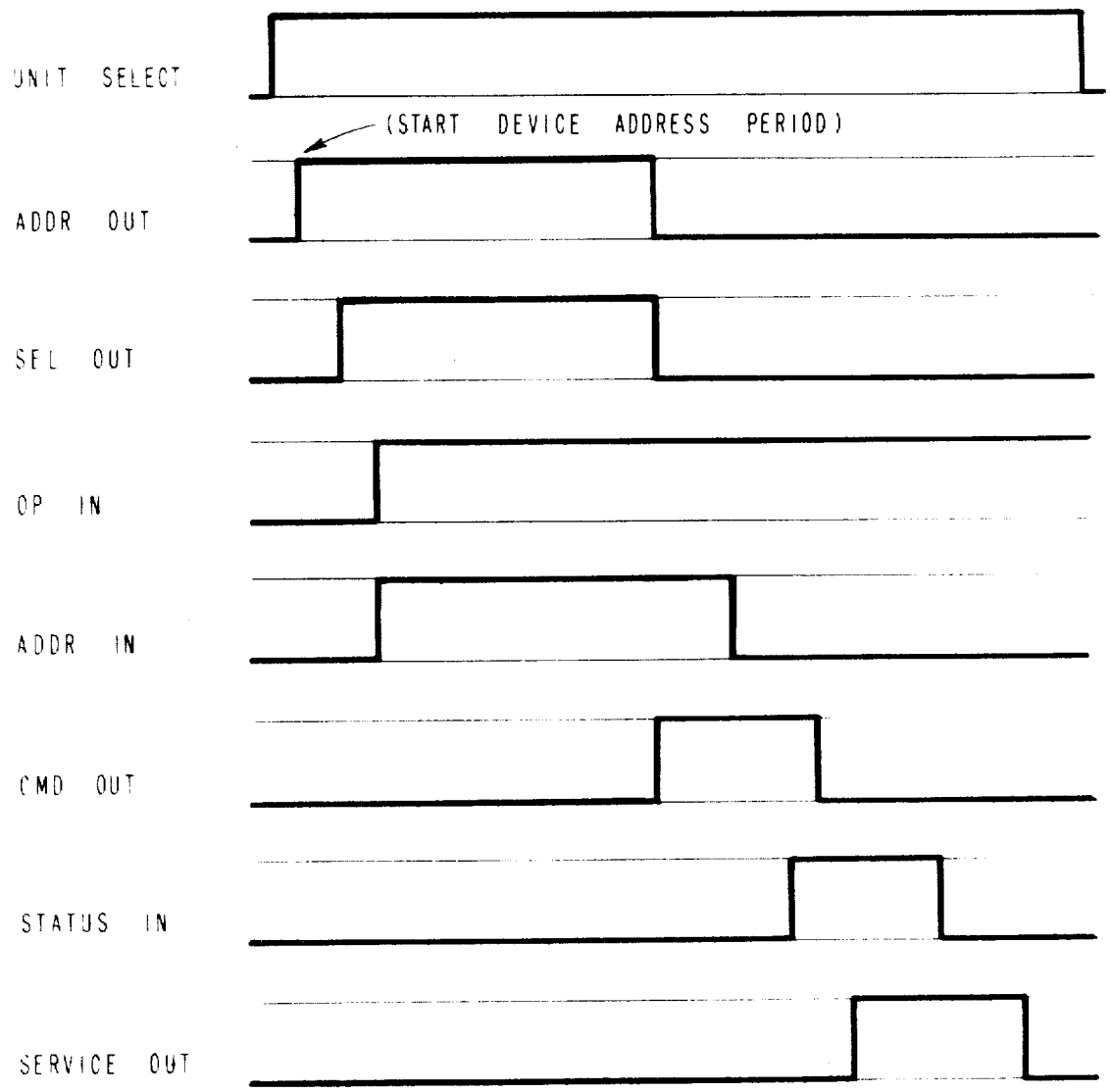
FIG. 6 illustrates important signals on an I/O-channel interface in relation to unit select timing, which provide a basis for some of the timing used by signals within the subject invention.

FIG. 6 represents signals on the most important of the I/O interface guidelines, for the purposes of the subject embodiment. More detail on this type of I/O interface is disclosed and claimed in U.S. Patent No. 3,336,582 issued Aug. 15, 1967 to W. F. Beausoleil et al.

Each channel is assumed to have the features found in standard commercial channels such as disclosed in the publicly available IBM Field Engineering Manual of Instruction titled "System/360 Model 50 Selector Channel" having form No. Y22–2826.

The computer system involving the CPU, channels, control units, and I/O devices used with this embodiment are presumed to operate in the manner explained in a publicly available publication titled "IBM System/360 Principles of Operation" (form No. A22–6821–5) which is an IBM Systems Reference Library publication.

Furthermore this computer system may include the methods of controlling its I/O devices, control units and channels as disclosed in the IBM Program Logic publication titled "IBM System/360 Operating System-Input/Output Supervisor" (form No. Y28–6616–1).

Background prior art is represented by the previously filed prior patent applications, presently unissued, each assigned to the same assignee as the subject application, as follows:

(1) Ser. No. 357,369, filed Apr. 6, 1964, inventors: L. E. King, W. C. Hoskinson, E. J. Annunziata, F. W. Wise, E. B. Pierce, titled "Automatic Channel Apparatus";

(2) Ser. No. 486,326, filed Sept. 10, 1965, inventors: P. N. Crockett, M. A. Krygowski, T. S. Stafford titled "Variable Prior Access System";

(3) Ser. No. 573,246, filed Aug. 18, 1966, inventors: M. A. Krygowski, T. S. Stafford, titled "Program Suspension System";

(4) Ser. No. 506,204, filed Nov. 3, 1965, inventors: T. S. Stafford, J. A. Sarubbi, titled "Fault Location System";

(5) Ser. No. 543,623, filed Apr. 19, 1966, inventors: L. E. King, E. B. Pierce, R. S. James, E. J. Annunziata, titled "Apparatus for Control of a Plurality of Peripheral Devices";

(6) Ser. No. 697,742, filed on the same day as the subject application, inventors M. W. Bee, D. J. Lang, A. D. Snyder, titled "Data Processing Machine Function Indicator";

(7) Ser. No. 697,738, filed on the same day as the subject application, inventors: B. L. McGilvray, D. J. Lang, W. E. Boehner, M. W. Bee, titled "Data Processing System Execution Retry Control."

The I/O interface provides the tag signals illustrated in FIG. 6 which are a simplified representation of the overall interface signals disclosed in U.S. Patent No. 3,336,582 (supra), except for the Unit Select signal, which is activated by setting a unit select trigger in the channel controls before an interface selection sequence and which is not reset until well after the initial interface sequence is completed. Briefly, the address-out (ADDR-OUT) line provides a signal from the channel of a device address on its bus-out lines. The select-out (SEL-OUT) tag line provides a signal immediately after the address-out line signal to indicate to the control unit that it is receiving a device address that should be selected if possible. When the control unit and I/O device are selected, the control unit raises the operational-in (OP-IN) line which stays up as long as the channel is selected to signal the device. Then the control unit raises the address-in (ADDR-IN) tag line to signal to the channel that the bus-in lines contain the address from the selected I/O device. Then the channel raises the command-out (CMD-OUT) tag line which signals to the control unit that a command is on the bus-out data lines for the selected I/O device. Shortly thereafter, the status-in tag line is raised by the selected control unit to signal the channel that the control unit has placed status information on the bus-in. When the status byte has been received by the channel, it signals back to the control unit by raising the service-out tag line.

When command chaining is used during the channel program, a suppress-out tag line is raised by channel to the control unit to indicate that operation by the same I/O device should continue after the end of the current operation.

Figure 7:
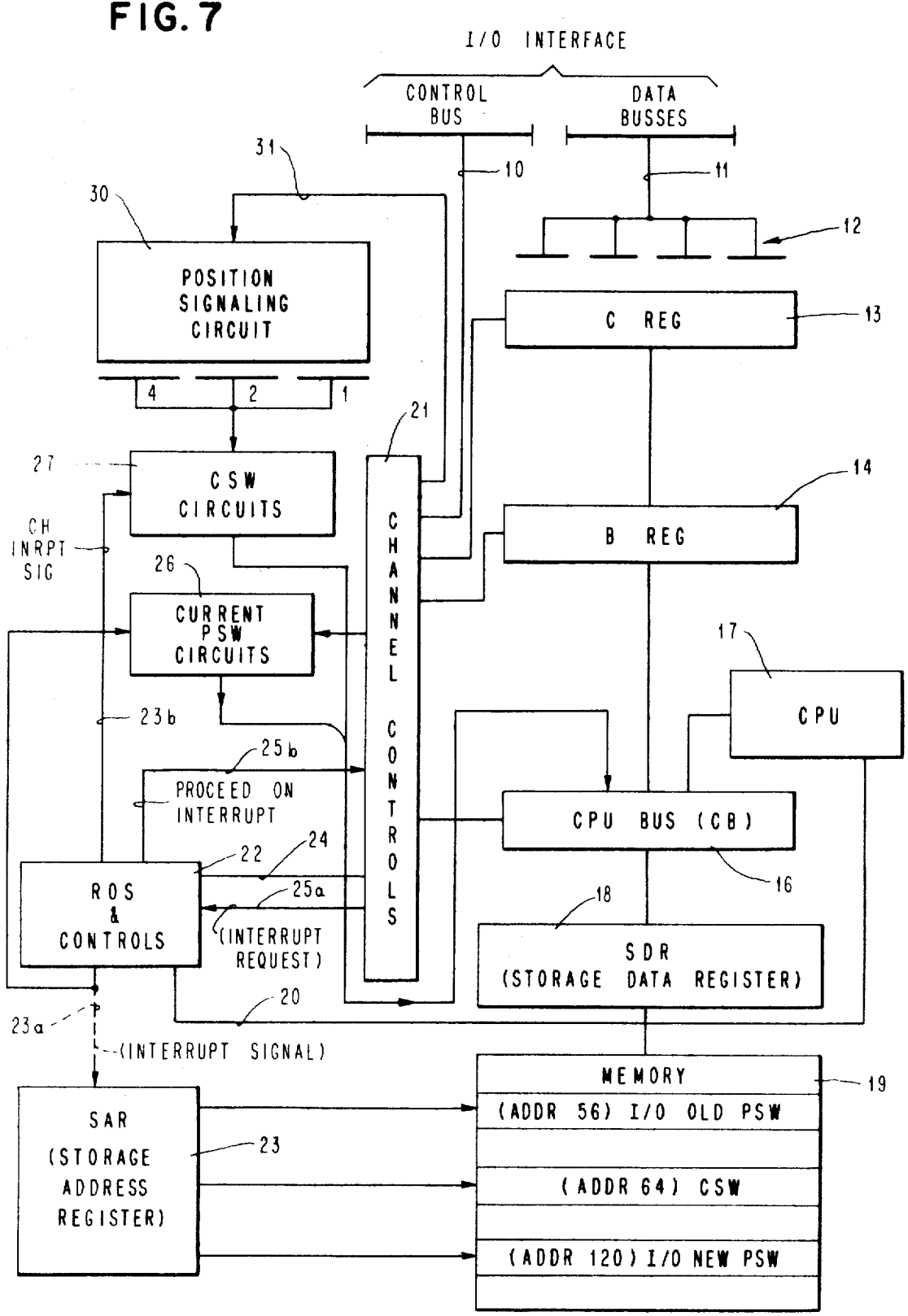
FIG. 7 illustrates a channel arrangement which includes the subject invention.
Figure 12:
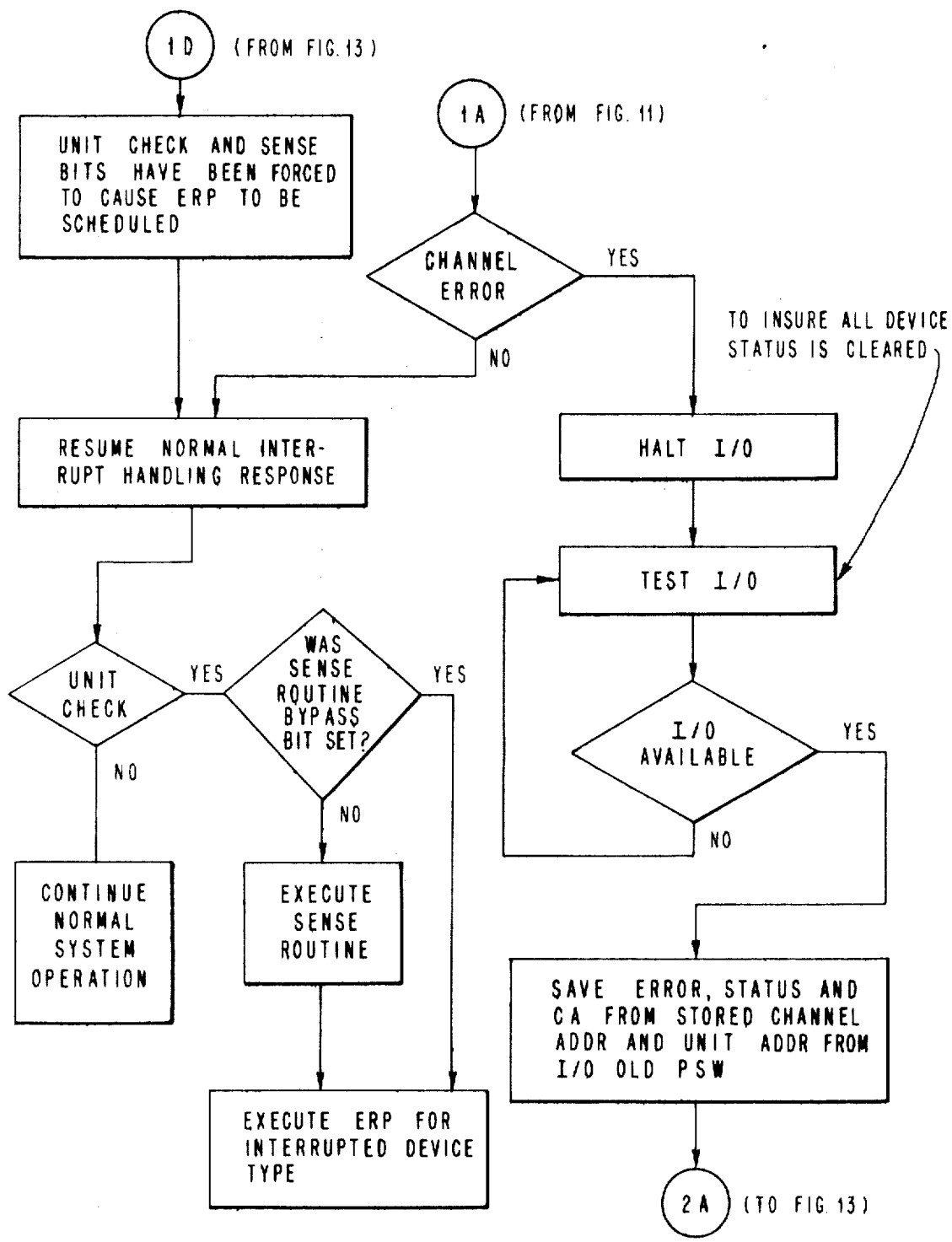
Figure 13:
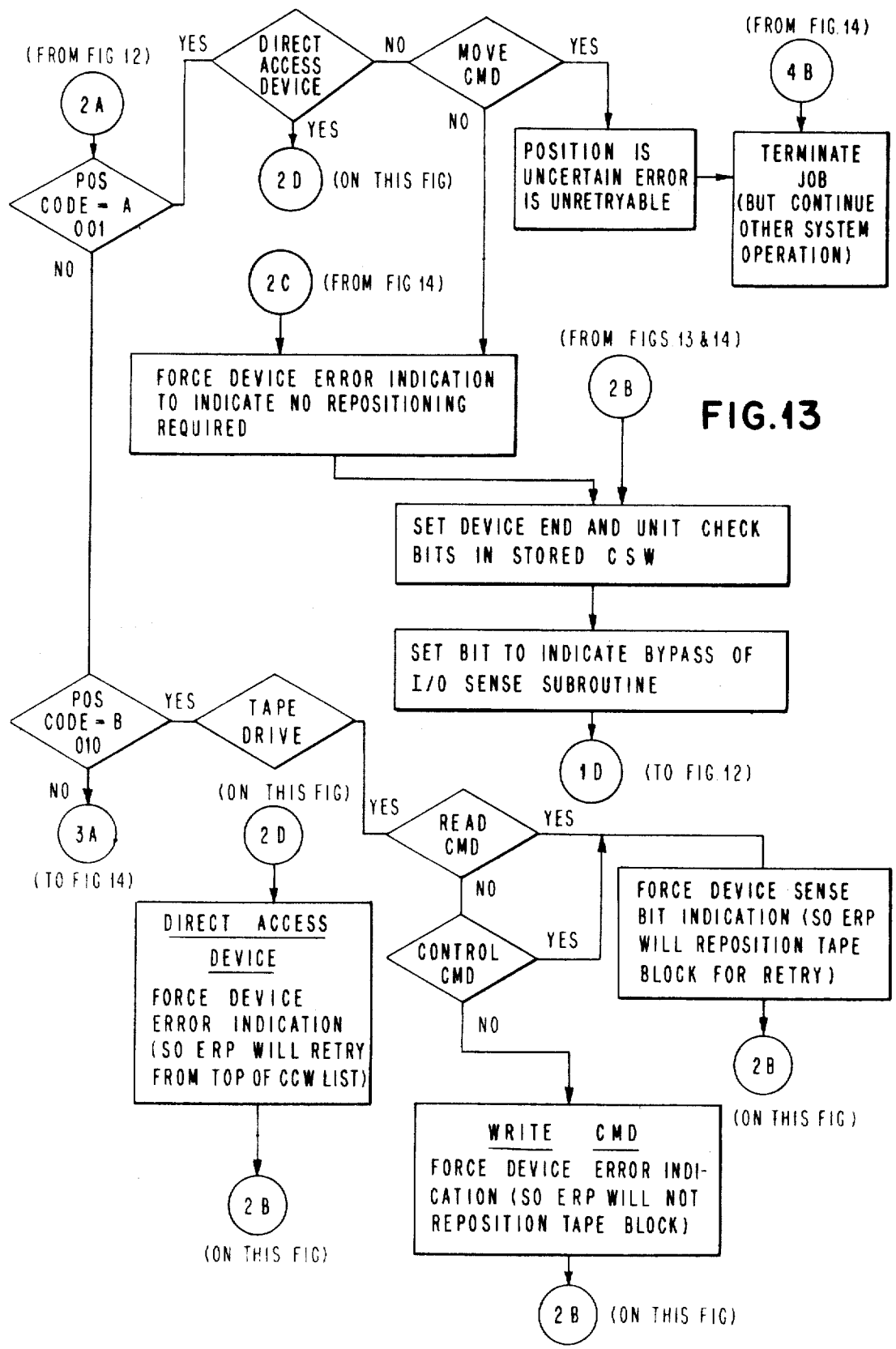
Figure 14:
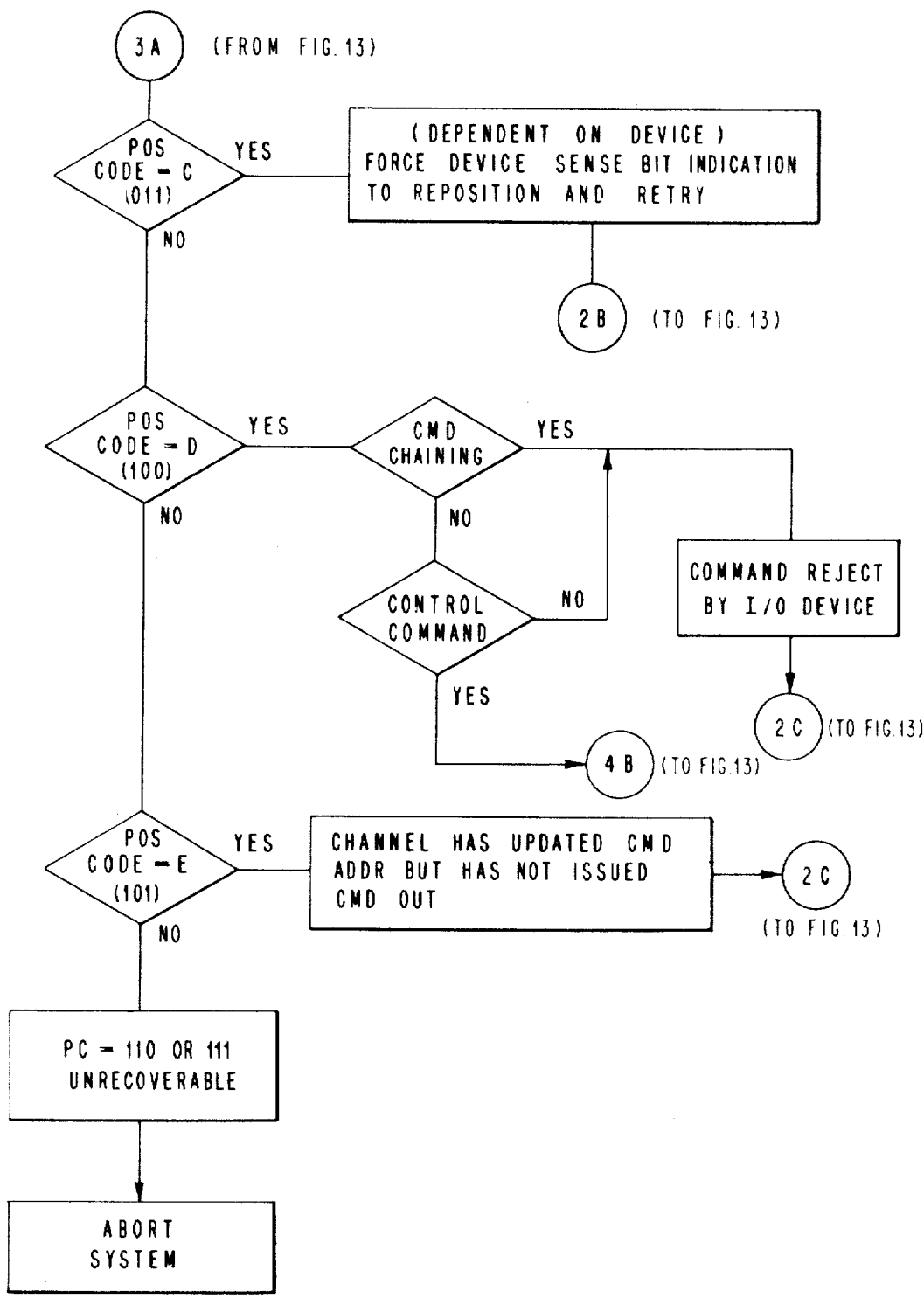
Figure 15:
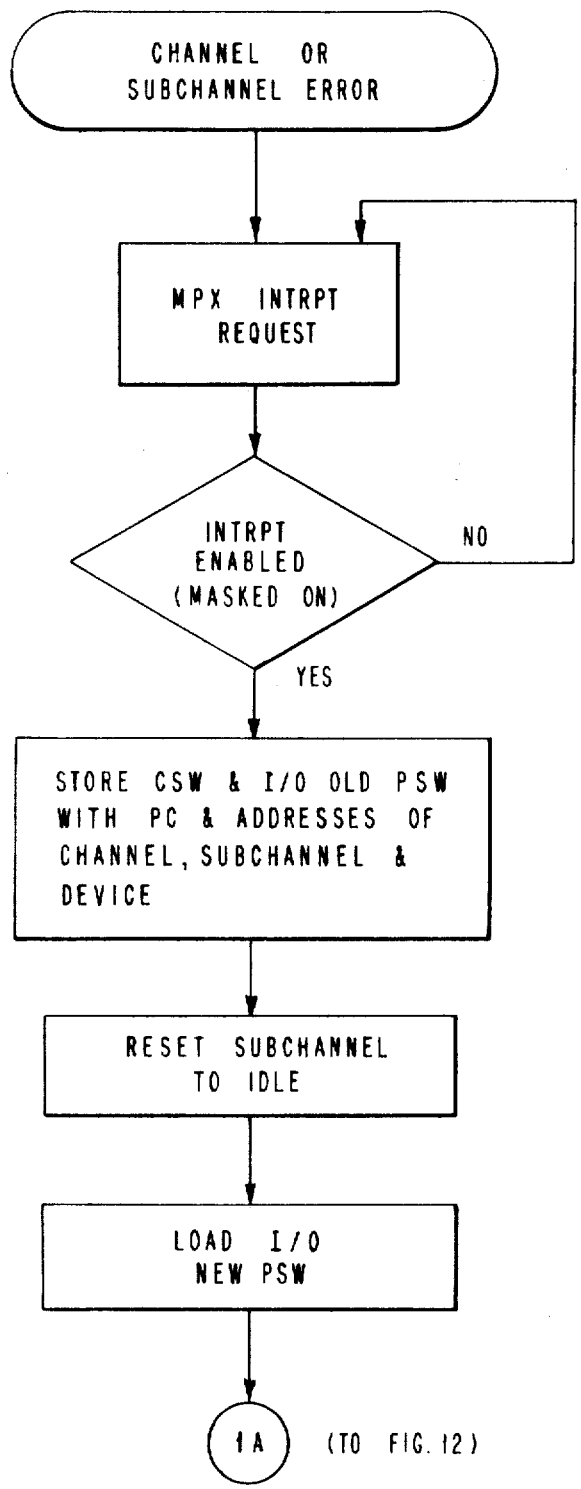

FIG. 7 illustrates the major component parts of a channel. The I/O interface is represented by control bus 10 and data busses 11. The latter comprises the bus-in, which has nine lines, and the bus-out, which has nine lines also. Control bus 10 comprises the tag lines which provide the signals shown in FIG. 6. The control bus lines are operated in the conventional manner by channel controls 21, which is actuated by the read only storage (ROS) and controls 22 via busses 24. The addresses for selection of the channel, control unit, and devices are transmitted from CPU 17 via the CPU bus 16, B register 14, C register 13, and byte selection gates 12 through the interface bus-out to the control units and devices connected thereto. After unit selection, the data flows from or to the I/O device through gates 12, where it is assembled or disassembled on a byte basis in C register 13, transmitted as a word to or from the B register 14, and to or from memory 19 via bus 16 and register 18 under control of the channel controls 21 and ROS and controls 22.

The current PSW resides in circuits 26 while the CSW is generated in circuits 27, and both are under control of ROS and controls 22. During a channel interrupt, the PSW and CSW are stored in fixed locations within memory 19, as illustrated, under control of a storage address register (SAR) 23 operated by the ROS and controls 22 in response to a channel or I/O interrupt signal.

In FIG. 7, the subject invention includes a position signaling circuit 30, which is controlled by channel controls 21 via busses 31. The outputs 4, 2, 1 of circuit 30 are provided to CSW circuits 27 from where they are placed into the CSW at the positions represented in FIG. 3B upon the occurrence of a channel induced interrupt. The PSW and CSW are sequentially transmitted to CPU bus 16 and SDR 18 to the I/O old PSW and CSW memory locations specified by SAR 23.

One form of Position Signaling circuit 30 is embodied in FIG. 8. This circuit binary coding of output bits 1, 2, and 4 on output lines 61C, 62C, and 63C from respective triggers 61, 62, and 63 represent the position codes A, B, C, D and E previously discussed in relation to FIG. 16. The binary coded settings of these three triggers represent a position code which corresponds to the channel-I/O device time-positions represented in FIG. 4 in the manner represented by the following Table I.

TABLE I

| Channel device position | Position code bits in CSW | | | Channel controls |
|---|---|---|---|---|
| | 4 | 2 | 1 | |
| A | 0 | 0 | 1 | Cmd Out to Cmd Accept or Cmd Reject. |
| B | 0 | 1 | 0 | Cmd Accept to 1st Byte transfer (not used while device multiplexing). |
| C | 0 | 1 | 1 | 1st Byte to CA Updated (while device multiplexing, from Cmd Accept to CA Updated. |
| D | 1 | 0 | 0 | Cmd Reject (static until Cmd Reject status is presented to CSW). |
| E | 1 | 0 | 1 | From CA updated to Cmd Out. |

DEFINITIONS OF CODED POSITIONS

Code A—time from when the channel issues a command to the device until the channel can determine whether the device has accepted or rejected the command. On moveable type commands (read, write) this is an unretryable code, but on non-moveable type commands (sense, some control immediate types) the current CCW is still retryable.

Code B—time from when the channel determines the device has accepted a command until the first byte of data is transferred across the interface. Code B is useful primarily for devices which do not begin movement until after the first byte of data is transferred, such as one a Selector Channel. In the case of a tape drive, a read command has moved the device, but a tape write command has *not* moved the device during Code B. In either case, motion is predictable. In the case of a control command, action previously was initiated at the device and movement is predictable.

Code C— the data handling time of a command, from the first byte in a selector channel through the end status portion, until a new Command Address (CA) is set up to be used in chaining. While multiplexing devices, from when the channel determines a command is accepted until the Command Address (CA) updated signal. The device movement is predictable.

Code D—time from when a device rejects a command until that rejection information (unit status byte) is presented in the CSW. Since the device rejected the command, no movement took place.

Code E—time from when the new command address is set up in chaining until the new command is signalled to the device. This code indicates to software that no control signaling is needed at the device level to retry that command. Retry should be started at the CCW that was being initiated.

DEFINITIONS OF DEVICE CLASSES

A device class comprises those device types which can have the CPU and/or channel retry the channel commands in the same way for the same position cores. Thus the use of the same Position Code for error retry may differ between different device class. Generally, the devices fall into one of three categories:

Class I: This class of devices will retry starting at the top of a CCW chain for any Position Code. The first CCW in a chain is indicated by the last CAW (Channel Address Word) for that device, which was in memory location 72 for an IBM S/360 computer. Examples of device types in this class are the IBM 1052 typewriter or the IBM 1311 Disk.

Class II: This class will retry the same CCW during which the error occurred, which is indicated by the CA in the CSW minus 8 bytes. This single retryable CCW can be in the middle of a CCW chain, as long as command chaining and data chaining are not mixed within the same chain. Examples of this class of device types are the IBM 2401 tape drive or the IBM 2540 reader punch using QSAM (Queued Sequential Access Method).

Class III: This class will not attempt retry at all for most position codes, for which a permanent error is signalled to the user. An example of this type is a 1403 printer, which retries only on PC=S, D or E.

The following Table II summarizes the retry relationship between device classes and Position Codes:

TABLE II

| Device class | Position codes | | | | | |
|---|---|---|---|---|---|---|
| | S | A | B | C | D | E |
| Class II (Example: tape). | CPU Retry | If moveable command, movement is uncertain, and terminate this job. If non-moveable command, retry current CCW. | If tape write command, no movement has occurred; retry current CCW. If tape read command, movement has occurred; reposition and retry current CCW. | If movement command, reposition and retry current CCW. If non-moveable command, retry current CCW without repositioning. | No movement occurred, retry current CCW. | |
| Class I (Direct Access). | CPU Retry | Retry from beginning of CCW list (i.e. from CCW addressed by CAW). | | | | |
| Class III (Example: printer). | CPU Retry | If moveable command, movement is uncertain, and terminate this job. If non-moveable command, retry current CCW. | Terminate job on channe, error (or reprint). | | No movement occurred. Retry current CCW. | |

Thus the position codes are particularly useful with Class II devices, such as tape drives on a selector channel or card readers or punches on a multiplexor channel.

The input lines 31a–m (except 31g) to the Position Signaling Circuit 30 in FIG. 8 (except for 31c) are conventional lines found in channels such as the IBM S/360 Model 50 Selector Channel (supra). In that channel the input lines have the following functions: the CA updated line 31a is used by the channel to signal that the Command Address (CA) has been updated by operation of ROS and Controls 22 in FIG. 7, which caused the previous Command Address to be transferred to the adder in CPU 17 and caused a number eight to be added thereto, which updated the previous Command Address to locate the current CCW. This updating operation occurs immediately before each next CCW is fetched.

The channel Idle line 31b is a line which is brought up while a selector channel, or a multiplexor subchannel is not in use. The Idle line 31b remains up while the channel (or subchannel) is not selected by the CPU, or receives a request from the I/O Interface and the channel (or subchannel) is not then executing any CCW.

The Set Code C line 31c indicates a first data byte for a selector channel or a Command Accept signal for a multiplexor channel, as explained later in FIG. 10.

The Unit Select line 31d is activated when a conventional unit select trigger (not shown) in the Channel Controls 21 in FIG. 7 is set whenever a command is to be executed by an I/O device. FIG. 6 shows the timing of the Unit Select signal in relation to other I/O Interface signals.

Command-Out line 31e is part of the I/O interface and is represented by the signal shown in FIG. 6, designated CMD-OUT, which is sent by the channel to instruct the I/O device that a command is being set for it on the Bus-Out lines.

The Command Accept line 31f and the Command Reject line 31h in FIG. 8 are provided by the circuit shown in FIG. 10, which is described later.

An OR circuit 48 receives all of the check signals conventionally available from the channel on lines 31j, k, l and m. Hence the occurrence of any recognized channel error causes a Channel Error signal on line 50 from OR circuit 48. Any Channel Error signal from circuit 48 sets a Channel Error trigger 50. Trigger 50 is reset by the Channel's Clear Interrupt line 31i after the interrupt information is received by the CPU. A channel Error line 57a from trigger 50 carries its true output, while a No Channel Error line 57b carries the complementary output from trigger 50. Hence the setting of trigger 50 by any channel error signal drops the No Channel Error signal on line 57b.

The occurrence of a channel error actuates the I/O interface through Channel Control 21 in FIG. 7 to cause the I/O device to stop. This is done by activation of the true output line 57a from trigger 50 in FIG. 8. Line 57a thus causes a Halt I/O Device signal.

In FIG. 8, the beginning of each time-position A, B, C, D, and E (explained in the example used with FIG. 4) is signalled by the respective enablement of input AND gates 44, 46 or 47, 43 and 41 which are cycled in the order shown in FIG. 18 during errorless execution of channel instructions. Only one input gate is enabled at any one time. The order path taken in FIG. 18 depends upon the (1) type of channel, (2) whether command or data chaining is used, and (3) the specific operation in the Channel Command Word. The label on each leg from each position code in FIG. 18 indicates the reason needed to generate the position code.

In FIG. 18, Positon Code C represents two conditions, C-I and C-D. C-I represents the channel idle condition signalled by line 31b. C-D is signalled by the Set Code C line 31c, which indicates either 1st Byte for a selector channel or Command Accept for a multiplexor channel.

The enablement of AND gate 44 sets position code A as the binary coding of triggers 61, 62 and 63. In a similar manner enablement of gate 46 sets triggers 61, 62 and 63 to position code B, enablement of AND gate 43 sets triggers 61, 62 and 63 to position code C, enablement of AND gate 47 sets these triggers to position code B, and enablement of AND gate 41 sets the triggers to position code E. The cycling of position code gates 41–47 is enabled by a No Channel Error output on lead 57b from OR circuit 48. Whenever any channel error is signalled by OR circuit 48, the No Channel Error signal is dropped, which freezes the then existing position code setting in position signaling circuit 30 in FIG. 8 at the time of the error.

A plurality of inverters 51, 52, 53, 54 and 56 are respectively connected to gates 41–47 to obtain their complementary outputs. Thus the true and complemented outputs of each of gates 41–47 are provided to triggers 61, 62 and 63 so that the three triggers are set to the code indicated in Table I as the inputs to gate 41–47 are actuated during normal channel operation. Only one of these five input gates can be activated at any one time due to the selection of their other inputs.

Each trigger 61, 62 and 63 is comprised of an OR circuit and an AND circuit; wherein the OR circuit output provides an input to the AND circuit, while the AND circuit output provides a feedback as an input to the OR circuit. Each input to the OR circuit can set the trigger while dropping any input to the AND circuit resets the trigger.

In operation, the circuit in FIG. 8 cycles through flexisting position codes as long as there is no channel error. However upon a channel error, all of the gates 41–47 will be blocked and triggers 61, 62 and 63 are frozen at the channel I/O device position code existing at the time of occurrence of the channel error, which induces a channel interrupt.

The three triggers 61, 62 and 63 remain set with the 4, 2, 1 bit position code caused by this channel error until after the position code bits are transferred with other status information to the CWS circuit 27 shown in FIG. 7 and from there to the CPU bus 16 which transmits the CWS to the storage data register 18. A memory cycle is actuated by the storage address register 23 in response to ROS and controls 22 upon a channel interrupt request from channel controls 21 on the lead 24, which causes a memory cycle wherein the storage address register 23 addresses memory location 64 and a memory storage cycle stores the CWS from the SDR 18 into this storage location.

The current PSW is stored in a similar manner in I/O old PSW memory location 56.

After the interrupt information is transferred to the CPU, a Clear Interrupt signal is sent to the channel to clear all interrupting conditions pertaining to this interrupt, including resetting of Channel Error trigger 50 in FIG. 8 via line 31t.

Thereafter the I/O supervisor shown in FIG. 9 can examine these three bits 1, 2 and 4 in the CSW and decode them into the particular position code A, B, C, D or E which they represent. The I/O old PSW shown in FIG. 2A provides the address of the Interrupting Channel and the address of the interrupted I/O device and its control unit.

The I/O supervisor can then operate the system as shown by the flow diagrams in FIGS. 11–15 using the sense bit information shown in FIG. 17 which is acquired whenever the sense routine is mentioned in the flow diagrams. These sense bits are manipulated in the manner stated in the flow diagrams in order to obtain selection and operation of the required device type ERP (Error Recovery Program) to obtain the type of retry needed at the particular time under the particular circumstances.

FIG. 10 illustrates a circuit for generating some of the signals sent to FIG. 8. The I/O Interface and its controls are described in Patent 3,336,582 (supra), and patent application Ser. Nos. 357,369 (supra) and 543,623 (supra). The Set Code C line 31c is the output of an OR circuit 79. It receives a 1st Byte signal from an AND gate 71, and it receives a Multiplexor Command Accept signal from an AND gate 76a to provide a Set Code C output to FIG. 8. A gate 76b provides a Selector Command Accept signal on lead 31f during Selector Channel operation, in which case there is no Multiplexor Command Accept signal provided. During Multiplexor Channel operation.

no Selector Command Accept signal is provided on lead 31*f*, and instead, the Multiplexor Command Accept signal on lead 78 actutes the Set Code C line 31*c*.

The Set Code C signal to circuit 30 in FIG. 8 causes it to operate differently for selector and multiplex channels, having the difference in FIG. 4; wherein position code B is eliminated for Multiplexor mode, and code C is extended up to where B would start for a selector channel, i.e. at a channel command Accept signal. Thus in FIG. 8, the Set Code C signal through OR circuit 42 causes AND gate 43 to be enabled at the time required in FIG. 4 for the appropriate channel type. When operated as a multiplexor channel, the absence of any Selector Command Accept signal from FIG. 10 prevents gate 46 from any enablement during Multiplexor Channel operation. Actuation of the 1st Byte signal in Multiplexor mode merely re-enables gate 43 to agin attempt to set triggers 61, 62 and 63 to code C when they are already set to code C, so that there is no disturbance to the position code output.

The 1st Byte AND gate 71 receives the Service-Out input on lead 31*n* and a Service-In on lead 31*g* from the I/O interface controls, which circuits are in the Channel Controls 21 of FIG. 7. The Service-Out signal (see FIG. 6) indicates to the I/O device that the channel has accepted the Status-In information from the I/O device. The Service-In line signals the I/O control unit each time the I/O unit has a byte of data available for transmission to the channel.

If the channel is dedicated to only one mode of operation, the non-required one of gates 76*a* or *b* can be eliminated; and the mode input lines can be both eliminated.

In FIG. 10, the Command Reject signal on line 31*h* is provided from gate 77 to gate 47 in FIG. 8. Gate 77 is conditioned by a Not Accept Status signal from an inverter 74 that receives the Status Accept output from circuit 73. Circuit 73 activates its Accept signal output to condition gates 76*a* and *b* when it receives an acceptable status byte on the Bus-In line 11*a* from the I/O device during the I/O interface communication of Status-In (FIG. 6). If an acceptable status byte is not received, gate 77 is conditioned instead of gates 76*a* and *b*. Only one of the three gates 76*a*, 76*b*, or 77 is actuated at any one time in response to no channel error, which causes an output from AND gate 70 in FIG. 10 when no channel error is signalled on line 57*b* form FIG. 8. Gate 70 is also conditioned by a Unit Select signal on lead 31*d* and the Operational-In signal on lead 31*p*, and a signal from a clock 72. Clock 72 provides a delayed signaling of the Status-In signal on line 31*s* from the I/O interface.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of providing information usable for recovery from a channel malfunction comprising the steps of:

generating discrete signals for representing time-positions of different parts of the execution of a computer channel instruction for controlling an I/O device, detecting the occurrence of a malfunction in said channel, and storing the discrete signals existing at the time said detecting step signaled the occurrence of said malfunction, whereby a stored form of said discrete signals communicates a channel time-position for said malfunction to a subsequently executed instruction.

2. A method as defined in claim 1 in which said generating step includes signaling time-position codes as said discrete signals which relate partciular parts of the execution of the current computer channel instruction to a movement or non-movement condition of said I/O device.

3. A method as defined in claim 1 in which said generating step includes signaling a time-position code at the end of execution of a channel instruction related to a fetch of a next channel instruction for controlling an I/O device.

4. A method as defined in claim 1 in which said generating step includes the following steps:

signaling a time-position code as a digital signal related to a transmission of a command by said channel for said I/O device, and signaling a time-position code by said channel of the acceptance or rejection of said command.

5. A method as defined in claim 1 in which said generating step also includes the following step: Signaling a time-position code for a transmission by said channel of the beginning of a data block to said I/O device.

6. A method as defined in claim 1 which includes the following step: transferring the discrete signals retained by said storing step to predetermined storage locations accessible to an error recovery operation that re-executes the channel instruction in execution during the occurrence of said error.

7. A method as defined in claim 3 in which said signaling step also includes the following step: signaling a time-position code for a change in an address for designating a following computer channel instruction.

8. A method as defined in claim 3 in which said signaling step includes signaling the time-position code of completion in the updating of the address for fetching the following instruction.

9. A method as defined in claim 3 in which said signaling step includes, signaling a time-position code for the updating of the address for a following I/O instruction including an execution of a transfer-in-channel instruction.

10. A method of providing information for recovery from a multiplexor channel error during a command chaining operation comprising the steps:

generating discrete signals for representing the existence during a no-error condition for said channel of a set of channel time-positions including, an idle state for said channel, a command-out state during which a command has been transmitted by said channel and said channel has not made a final determination of a response to said command by an I/O device, a data transfer by said channel following said final determination, and an updating of an address for obtaining a following command, storing said discrete signals during their respective existence, detecting the occurrence of channel error, and blocking any further operation of said storing step upon said detecting step signaling a channel error, whereby the last condition of said storing step is preserved to provide information regarding said channel and said I/O device useful for their recovery from said channel error.

11. A method of providing information for recovery from a selector channel error during a command chaining operation comprising the steps:

generating discrete signals for representing the existence during a no-error condition for said channel of a set of channel time-positions including, an idle or data transfer state for said channel, a command-out state during which a command has been transmitted by said channel and said channel has not made a final determination of a response to said command by an I/O device, a command accept or reject state existing until a data transfer, and an updating of an address for obtaining a following command, storing said discrete signals during their respective existence, detecting the occurrence of a channel error, and blocking any further storing of said discrete signals upon said detecting step signaling a channel error, whereby the last storing operation by said storing step is preversed for recovery from said channel error by said channel and said I/O device.

12. Means for providing information for the recovery from an error in-board to a channel, comprising means for signaling the movement condition of an I/O device in relation to parts of a currently executing channel instruction, means for storing an existing state of said signaling means upon the occurrence of said error, means for providing a computer system to interrupt upon the occurrence of said error, and means for transferring an output from said storing means into predetermined storage location accessible to an error recovery operation in response to said interrupt.

13. A circuit for storing time-position information which relates I/O device movement to the execution of a channel instruction, comprising a plurality of gates receiving channel signals relating to channel instruction execution, a plurality of storage devices, circuit means connecting said gates to said storage devices for uniquely setting said storage devices upon the reception of different of said channel signals by said gates, and means for selecting a particular time-position code by blocking any change in the setting of said storage devices upon the detection of a channel error, whereby a blocked setting can be used by a computer system in recovering from a channel error.

14. Circuit means as defined in claim 13 for use in recovering from a channel error further including, means for interrupting the channel operation in response to said channel error, other storage means accessible to an error recovery operation for repositioning the I/O device and said channel instruction for retrying an interrupted operation, means for transferring the settings of said storage devices to said other storage means by operation of said interruption means in response to said channel error.

15. Means for providing information usable for recovery from a channel error comprising means for generating discrete signals for representing channel time-positions in relation to the execution of different parts of a computer channel instruction for controlling an I/O device, means for detecting the occurrence of an error in said channel, and means for storing the discrete signals provided by said generating means when said detecting means detects said error, whereby said stored discrete signals can indicate to a subsequently executed instruction whether said I/O device is required to be placed in a prior state before retrying said computer channel instruction.

16. Means as defined in claim 15 in which said generating means provides discrete signals including means for signaling a time-position code relating a movement condition for said I/O device to a particular part of the execution of the current computer channel instruction.

17. Means as defined in claim 15 in which said generating means includes means for signaling a time-position code at the end of execution of a channel instruction for relating a fetch of a next channel instruction for controlling a I/O device.

18. Means as defined in claim 15 in which said generating means includes means for signaling a time-position code for relating a transmission of a command by said channel for ing a I/O device.

and means for signaling another time-position code of the acceptance or rejection of said command by said channel.

19. Means as defined in claim 15 in which said generating means also includes means for signaling a time-position code for a transmission by said channel of the beginning of a data block to said I/O device.

20. Means as defined in claim 15 which includes means for transferring the discrete signals retained by said storing means to predetermined storage locations accessible to an error recovery operation that re-executes the channel instruction in execution during the occurrence of said error.

21. Means as defined in claim 17 in which said signaling means also includes means for signaling the time-position code for a change in an address for designating a following computer channel instruction.

22. Means as defined in claim 17 in which said signalling means includes means for signaling the time-position code of completion in the updating of the address for fetching the following instruction.

23. Means as defined in claim 17 in which said signaling means includes, means for signaling the time-position code for the updating of the address by a transfer-in-channel instruction.

24. Means for providing information for recovery from a multiplexor channel error during a command chaining operation comprising means for generating discrete signals for representing the existence during a no-error condition for said channel of a set of channel time-positions including, means for signaling an idle state for said channel, means for signaling a command-out state during which a command has been transmitted by said channel and said channel has not made a final determination of a response to said command by an I/O device, means for signaling a data transfer to or from said I/O device by said channel following said final determination, and means for signaling an updating of an address for obtaining a following command, means for storing said discrete signals during their respective existence, means for detecting the occurrence of a channel error, and means for blocking any further operation of said storing means upon said detecting means signaling a channel error, whereby the last condition of said storing means is preserved to provide information regarding said channel and said I/O device useful for their recovery from said channel error.

25. Means providing information for recovery from a selector channel error during a command chaining operation comprising means for generating discrete signals for representing the existence during a no-error condition for said channel of a set of channel time-positions including, means for signaling idle or data transfer state for said channel, means for signaling a command-out state during which a command has been transmitted by said channel and said channel has not made a final determination of a response to said command by an I/O device, means for signaling a command accept or reject state existing until a data transfer, and means for signaling an updating of an address for obtaining a following command, means for storing said discrete signals during their respective existence, means for detecting the occurrence of a channel error, and means for blocking any further storing of said discrete signals upon said detecting means signaling a channel error, whereby the last storing operation by said storing means is preserved for recovery from said channel error by said channel and said I/O device.

References Cited

UNITED STATES PATENTS

| | | | |
|---|---|---|---|
| 2,951,229 | 8/1969 | Goldstein | 340—172.5 |
| 2,975,407 | 3/1961 | O'Brien | 340—172.5 |
| 3,078,448 | 2/1963 | O'Brien | 340—172.5 |
| 3,085,230 | 4/1963 | Shoultes et al. | 340—172.5 |
| 3,092,810 | 6/1963 | Schmidt | 340—172.5 |
| 3,261,003 | 7/1966 | Cogar et al. | 340—172.5 |

OTHER REFERENCES

Reference Manual—IBM 7080 Data Processing System, December 1961, pertinent pages 6, 7, 12–22, 25–29, 58–64, 68, 69, 83–86.

PAUL J. HENON, Primary Examiner

M. E. NUSBAUM, Assistant Examiner